United States Patent [19]
Zinnbauer

[11] 3,978,985
[45] Sept. 7, 1976

[54] TWO-PIECE CASE

[75] Inventor: Gerald Boyd Zinnbauer, Carmel, Ind.

[73] Assignee: Eli Lilly and Company, Indianapolis, Ind.

[22] Filed: Apr. 30, 1975

[21] Appl. No.: 572,994

[52] U.S. Cl. .............................. 206/387; 206/493; 229/44 R
[51] Int. Cl.² ........................................ B65D 85/67
[58] Field of Search........... 206/45.14, 45.19, 45.28, 206/45.3, 72, 387, 408, 493, 525, 228; 229/33, 43, 44 R; 40/312

[56] References Cited
UNITED STATES PATENTS

| | | |
|---|---|---|
| 2,644,259 | 7/1953 | Beadle .................................. 40/312 |
| 3,272,325 | 9/1966 | Schoenmakers ..................... 206/387 |
| 3,352,478 | 11/1967 | Wood ................................ 229/44 R |
| 3,734,334 | 5/1973 | McCrea ......................... 229/43 UX |

*Primary Examiner*—Steven E. Lipman
*Attorney, Agent, or Firm*—Houston L. Swenson; Everet F. Smith

[57] ABSTRACT

A two-piece case comprising a rectangular receptacle having a pair of pivot elements extending from its inner surfaces to which a flexible cover is engaged whereby the cover may be retained in a position which permits it to be hinged and latched to the receptacle.

8 Claims, 10 Drawing Figures

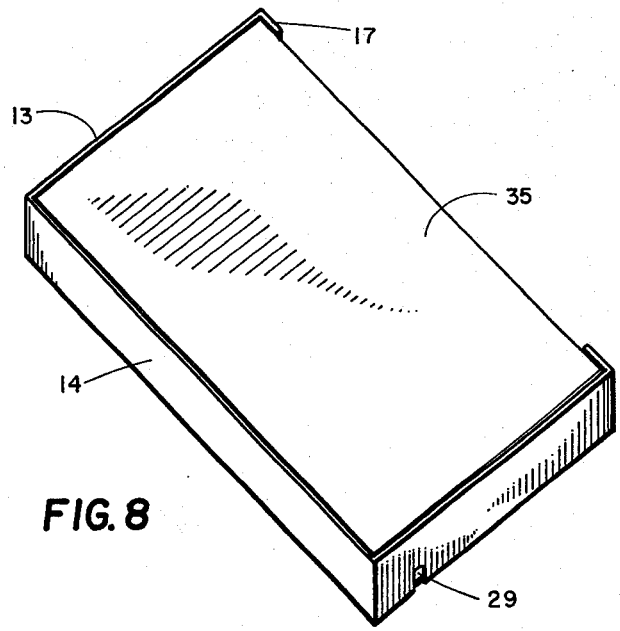
FIG. 8
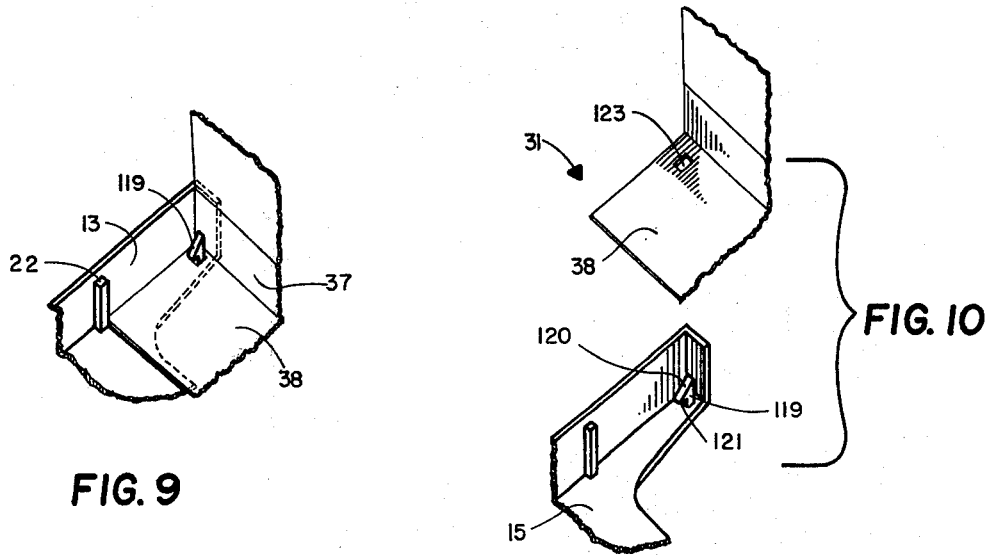
FIG. 9
FIG. 10

TWO-PIECE CASE

BACKGROUND OF THE INVENTION

In the field of packaging numerous approaches have been taken to utilize two different types of materials for designing a package or case having a cover and a receptacle. Plastic materials have been widely used and have been very satisfactory in providing a light weight and rigid structure. Paperboard and flexible plastic sheet material have also been used extensively in view of their relatively low cost feature as well as being able to readily receive decorative printed material. In some types of cases such as those used for tape cassettes various designs have been produced utilizing plastic materials which adequately retain the cassette. In order to provide a variation of printed material means have been developed to include in such packages a paperboard insert which identifies the contents of the case.

One such type of case is that found in U.S. Pat. No. 3,272,325, Schoenmakers, issued on Sept. 13, 1966. The case shown in this patent utilizes two components, both being formed of a rigid plastic material such a s polystyrene. Cases of this type have been especially popular for containing tape cassettes. However, as mentioned bove, in order to fully identify and promote the contents of the case, a paperboard insert has usually been inserted on the inside of the transparent plastic cover.

SUMMARY OF THE INVENTION

The case of my invention, at first glance, utilizes a receptacle that appears to be quite similar to that illustrated in Schoenmakers patent. However, my receptacle has been modified to include a pair of pivot elements which extend from the inner surfaces of the side walls and are positioned in a closely spaced relationship with the bottom and rear wall sections of the receptacle. The cover of paperboard is formed from a light weight flexible material such as paperboard and is rectangular with three creaselines to provide a means for conforming with the interior surfaces of the receptacle as well as containing a portion of the contents therein. Thus, when adapted for containing a cassette, my case provides a relatively low cost structure which also offers all of the functional features obtained from the Schoenmakers case.

BRIEF DESCRIPTION OF THE DRAWING

FIG. 8 is a perspective view of my case when closed.

FIGS. 9 and 10 are partial views in perspective of a second embodiment of my invention.

DESCRIPTION OF THE PREFERRED EMBODIMENTS

Figures 1, 2:
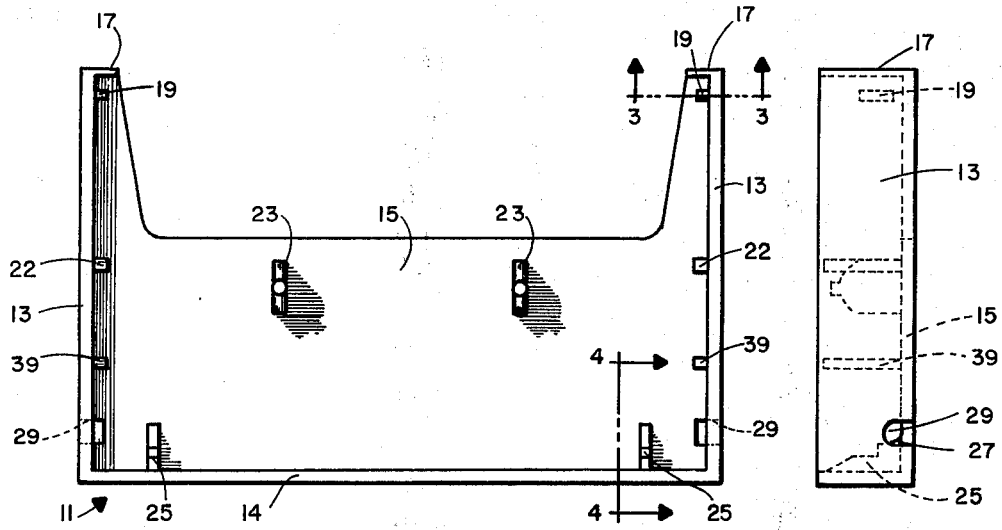
FIGS. 1 and 2 of the drawing are top and side plan views of the case of my invention.

Referring to FIGS. 1 and 2 of the drawing, receptacle 11 is shown which may be made of a rigid material such as polystyrene. The specific design of the receptacle is such tht it may be used for containing a tape cassette. However, it is to be understood that the principles of my inventive concept may be utilized on other types of containers. Receptacle 11 has a pair of side walls 13, a front wall 14 and a bottom wall 15, which has a portion cut away. Side walls 13 have a pair of rear wall sections comprising corners 17. These walls all cooperate to form a rectangular container which approximates th dimensions of a tape cassette.

Figure 3:
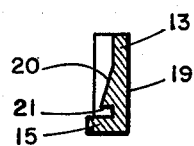
FIGS. 3 and 4 are views in cross-section taken along lines 3—3 and 4—4 of FIG. 1.

Extending from the inner surfaces of side walls 13 are a pair of like retaining or pivot elements 19. These elements are positioned in a closely spaced relationship with bottom wall 15 and the rear corners 17. This spaced relationship is best seen in FIGS. 2 and 3 which illustrate each pivot element as having a top ramp surface 20 that inclines downwardly away from its respective side wall 13 and a flat base surface 21.

Figure 4:
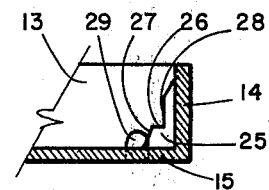

A pair of reinforcing and locating ribs 22 are positioned on side walls 13 and extend down to bottom wall 15. In line with these two locating ribs are a pair of spaced reel lugs 23 which likewise extend from the bottom wall. Reel lugs 23 are of conventional design and are adapted for fitting into the reel hubs of a tape cassette. A pair of lead-in front posts 25 are positioned in a spaced relationship with each other and at the junction of the bottom wall 15 and front wall 14. As best seen in the cross-sectional view of FIG. 4, each of these lead-in front posts has a shelf 26, a concave surface 27 and a vertical surface 28. A pair of holes 29 are formed in each side wall and positioned near the front wall. These holes provide a means for mounting the cases on stands having rods.

Figure 5:
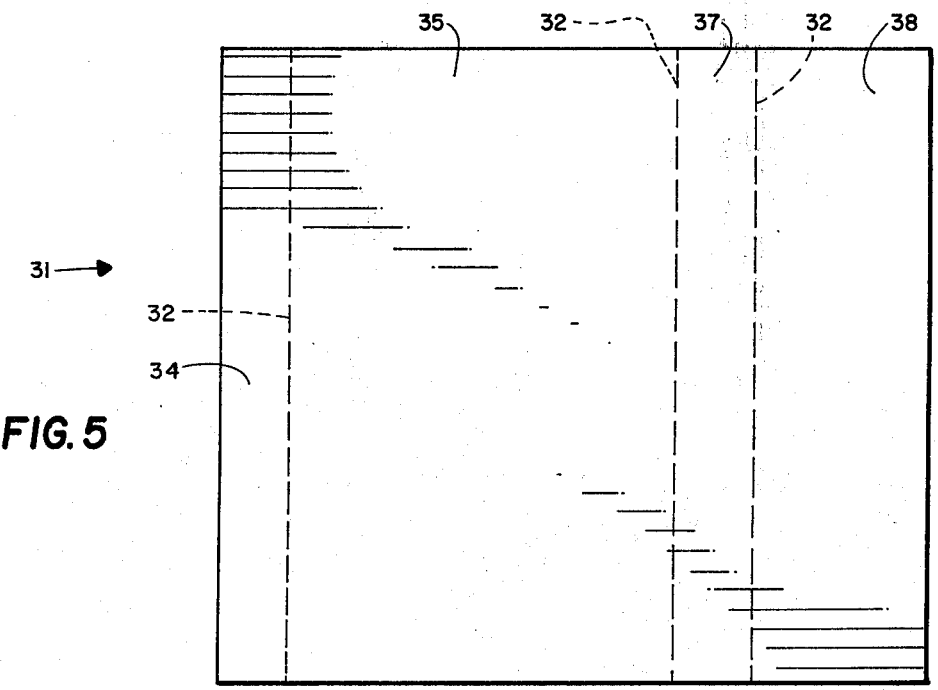
FIG. 5 is a top plan view of the paperboard blank used for forming the cover of my case.
Figure 6:
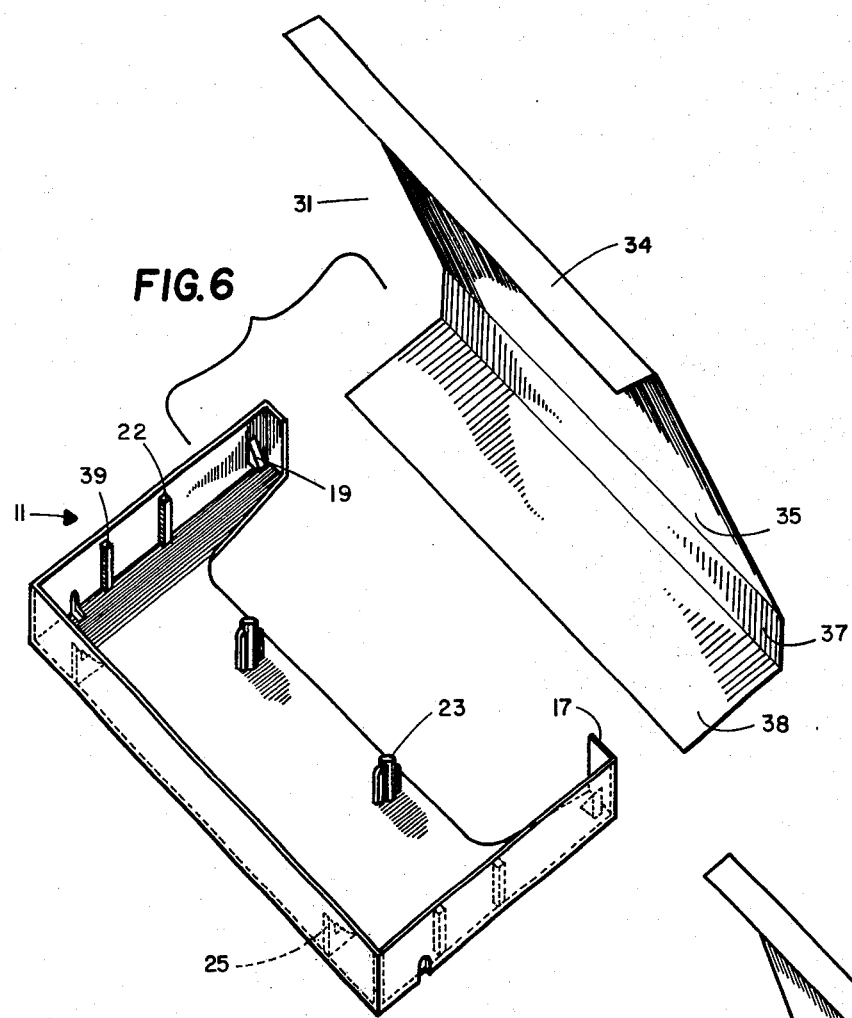
FIG. 6 is an exploded view of the receptacle and cover of my invention.

Cover 31 as shown in FIG. 5 comprises a rectangular blank formed from a lightweight flexible material of paperboard or plastic composition. This cover is folded along the dotted lines 32 to form a front panel 34, a top panel 35, a rear panel 37 and a bottom panel 38. as shown in FIG. 6 the cover 31, after being folded along the fold lines forms a pouch which receives a tape cassette. To assemble cover 31 to receptacle 11 the junction or fold line 32 of bottom panel 38 and rear panel 37 is positioned between pivot elements 19 and rear corners 17. Thus, the pivot elements become engaged with the cover bottom panel and selectively maintain it adjacent the receptacle bottom wall 15 as well as holding cover rear panel 37 adjacent receptacle rear corners 17. This assembly can be done by slightly bowing bottom panel 38 so that it will readily fit under the pivot elements. However, it has been found that the preferred technique with respect to cases adapted for containing cassettes is to force bottom panel 38 downwardly against the pivot elements until it slides underneath and is captured between base surfaces 21 and receptacle bottom wall 15. Cover rear panel 37 is therby snugged against rear corners 17. To facilitate this type of insertion pivot elements 19 may be provided with a top ramp surface 20 which permits the gradual sliding of the cover panels downwardly until they are seated underneath the elements.

It has been determined that existing production assembly techniques for loading tape cassettes into cases can be utilized with this new and improved case. A cassette is simply inserted into the cover which is folded to form the pouch configuration illustrated in FIG. 6. The cassette is thus sandwiched between top panel 35 and bottom panel 38 and then positioned over receptacle 11. A quick downward force is applied to this sandwich arrangement whereby the cover panels 37 and 38 are seated about pivot elements 19.

Accidental separation of the cover from its receptacle is prevented by pivot elements 19 as well as the rear sections or corners 17 and locating ribs 22. Thus, rear movement of the cover is prevented by the corner sections 19. Forward movement is prevented by the locating ribs 22 and the reel lugs 23. As shown in FIG. 2, the ribs 22 extend to a point just below the top edges of walls 13 whereby cover top panel 35 is prevented from substantially descending into the receptacle 11. This avoids deformation of the cover which would otherwise tend to be pressed against the cassette and assume its configuration. A second pair of ribs 39 may be provided to further assure unwanted displacement of cover 35. Upward movement of the cover is limited by the base surfaces 21 of pivot elements 19.

When a cassette is inserted into this case one of its edges rests against the shelf 26 of the lead-in front posts 25. Concave surface 27 has been provided so that in the event this edge of the cassette should be accidentally displaced from shelf 26 it will not be locked against the posts 25 and can instead be easily moved up surface 27 and again back onto shelf 26. It is noted that concave surface 27 is positioned so that it does not obstruct hole 29 which has been provided for mounting the case on a rod.

Figure 7:
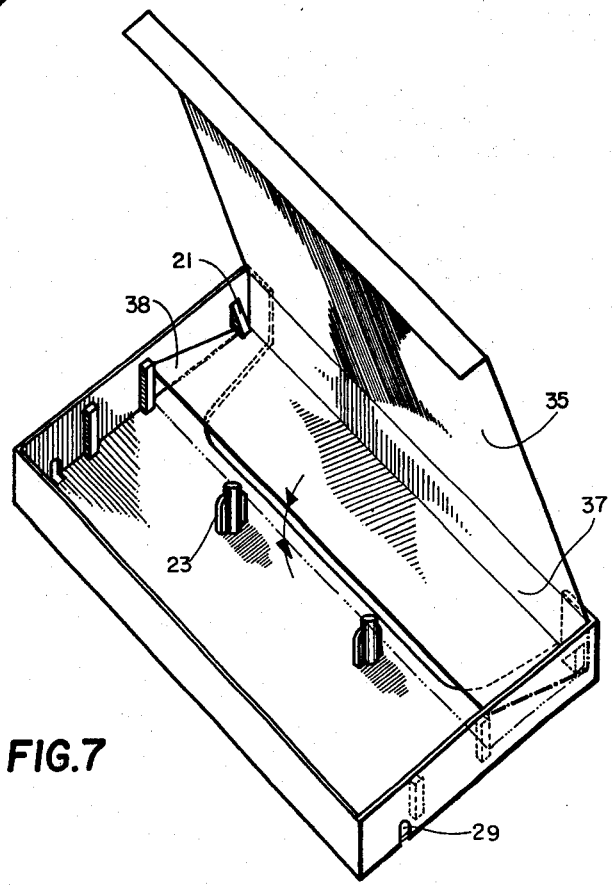
FIG. 7 is a view of my case in an assembled and open position.

The provision of the cutaway portion in the bottom wall 15 of the receptacle enables one to open this case in a mannr similar to that used in opening the case of U.S. Pat. No. 3,272,325. Thus, one may simply grip the back portion of the case between the thumb and forefinger and pivotally elevate cover 31 containing a cassette into the position of FIG. 7. Once the cassette clears reel lugs 23 it may be readily removed from the pouch configuration of cover 31. Maintaining the case in a closed position is facilitated by pressure of the cassette against front panel 34 of the cover whereby this panel is forced against vertical surface 28 of post 25.

Referring to FIGS. 9 and 10, a modified means is illustrated for engaging the bottom panel of 38 of the cover with the pivot elements. Pivot elements 119 are provided in the form of a pair of barbs which are positioned on receptacle bottom wall 15 in a manner similar to the pivot elements 19 of the first embodiment with the exception that elements extend from the side walls 13. Each pivot element 119 has an inclined surface 120 which serves as a ramp and a base or retaining surface 121 which is spaced above bottom wall 15. The height of these pivot elements must be such that they will not cause a cassette placed thereon to interfere with the closure of cover 31. Thus, the point of each element is preferably at a height that is substantially no greater than the height of shelves 26 on lead in front posts 25. In such a manner, a cassette can then be positioned on the pair of shelves 26 and the pair of pivot elements 119.

Cover 31 has been modified in this second embodiment by the provision of a pair of apertures 123 in bottom panel 38. The positioning of each of these apertures is such that it will be in direct alignment for passage over a respective pivot element and still permit the front edge of bottom panel 38 to butt against locating ribs 22. The assembly of cover 31 to receptacle 11 may be accomplished in a manner similar to that described for the first embodiment of my invention. Thus, a cassette may be inserted between bottom panel 38 and top panel 35 of the cover, forming a sandwich like structure. This structure may then be pressed downwardly into the receptacle with holes 123 passing over the inclined surfaces or ramps 120 and becoming engaged with the base surfaces 121 of the pivot elements. Once assembled, the opening and closing of this modified case is similar to that described for the first embodiment.

I claim:

1. A case comprising a rigid rectangular receptacle and a rectangular cover formed from flexible sheet material, said receptacle having a pair of side walls, a front wall, and a bottom wall integrally connected together, said side walls having a pair of rear corners, a pair of pivot elements extending from the inner surfaces of said receptacle adjacent to and in closely spaced relationship to said side walls and said rear corners, said cover having two parallel fold lines defining a top panel, a rear panel and a bottom panel, said pivot elements being engaged with said bottom panel contiguous to said fold line between said bottom and rear panels for pivoting of said bottom panel thereabout from a closed position to an open position with said pivot elements further maintaining said rear panel adjacent said receptacle rear corners.

2. A case in accordance with claim 1 in which each of said pivot elements has a bottom surface parallel to said bottom wall.

3. A case in accordance with claim 2 in which each of said pivot elements has a top ramp surface inclining downwardly away from its respective side wall.

4. A case in accordance with claim 3 in which a pair of locating ribs extend from the inner surfaces of said side walls.

5. A case in accordance with claim 4 in which a pair of spaced reel lugs extend from said bottom wall for engagement with the reel hubs of a tape cassette.

6. A case in accordance with claim 5 in which said bottom wall has a cutaway portion extending from said rear corners toward said reel lugs and said cover bottom panel is positioned over said cutaway portion and terminates adjacent said locating ribs.

7. A case in accordance with claim 6 in which said cover has a front panel extending from said top panel and is folded adjacent the inner surface of said front wall.

8. A case in accordance with claim 7 in which said fold line between said rear panel and bottom panel is pivotally seated against said pivot elements.

* * * * *